United States Patent
Poirier et al.

[11] Patent Number: 6,037,071
[45] Date of Patent: *Mar. 14, 2000

[54] CURRENT INTERRUPTER FOR ELECTROCHEMICAL CELLS

[75] Inventors: Jeffrey Poirier, Bedford; Paul Cheeseman, Holliston; Michael McDermott, East Weymouth; Jane A. Blasi, Acton; Reynald Cantave, Bridgewater; Jeffrey Hewes, Holliston; Yelena Kouznetsova, Sharon; Bhupendra Patel, Mansfield, all of Mass.; Alex Kaplan, Providence, R.I.; Viet Vu, Medway; William T. McHugh, Westwood, both of Mass.; Lucien P. Fontaine, Lincoln, R.I.; Robert J. Pinault, Canton, Mass.

[73] Assignee: Duracell Inc, Bethel, Conn.

[*] Notice: This patent is subject to a terminal disclaimer.

[21] Appl. No.: 08/965,494

[22] Filed: Nov. 6, 1997

Related U.S. Application Data

[63] Continuation-in-part of application No. 08/831,612, Apr. 10, 1997, Pat. No. 5,879,832, which is a continuation-in-part of application No. 08/720,616, Oct. 2, 1996, Pat. No. 5,691,073.
[60] Provisional application No. 60/015,153, Apr. 10, 1996.
[51] Int. Cl.[7] ................................................ H01M 2/12
[52] U.S. Cl. ................................. 429/7; 429/61; 429/62; 429/53
[58] Field of Search ................................. 429/53, 54, 56, 429/57, 61, 62, 72, 7, 163, 170, 171, 172, 89

[56] References Cited

U.S. PATENT DOCUMENTS

| | | | |
|---|---|---|---|
| 3,373,057 | 3/1968 | Jost et al. | 136/6 |
| 3,617,386 | 11/1971 | Bosben et al. | 136/107 |
| 4,035,552 | 7/1977 | Epstein | 429/58 |
| 4,855,195 | 8/1989 | Georgopoulos et al. | 429/54 |
| 4,975,341 | 12/1990 | Tucholski et al. | 429/62 |
| 4,992,339 | 2/1991 | Georgopoulos | 429/7 |
| 5,766,793 | 6/1998 | Kameishi et al. | 429/62 |

FOREIGN PATENT DOCUMENTS

| | | |
|---|---|---|
| 5-234614 | 2/1997 | Japan . |
| 5-266878 | 2/1997 | Japan . |
| 106803 | 4/1997 | Japan . |
| 106804 | 4/1997 | Japan . |

*Primary Examiner*—Maria Nuzzolillo
*Assistant Examiner*—Monique Wills
*Attorney, Agent, or Firm*—Barry D. Josephs; Paul I. Douglas; Thomas G. Krivulka

[57] ABSTRACT

A current interrupt mechanism for electrochemical cells is disclosed. A thermally activated current interrupt mechanism is integrated into an end cap assembly for an electrochemical cell. The thermally responsive mechanism preferably includes a free floating bimetallic disk or shape memory alloy member which deforms when exposed to elevated temperature causing a break in an electrical pathway within the end cap assembly. This prevents current from flowing through the cell and effectively shuts down an operating cell. The thermally responsive mechanism may include a heat producing electrical resistance means, preferably a Zener diode, to enhance thermal sensitivity. The end cap assembly may include a pressure responsive mechanism which ruptures when there is extreme gas pressure buildup. Gas is allowed to escape from the cell interior to the external environment through a series of vent apertures within the end cap assembly.

65 Claims, 9 Drawing Sheets

6,037,071

CURRENT INTERRUPTER FOR ELECTROCHEMICAL CELLS

This application is a continuation in part of application Ser. No. 08/831,612 filed Apr. 10, 1997 now U.S. Pat. No. 5,879,832 which is a continuation in part of Ser. No. 08/720,616 filed Oct. 2, 1996 now U.S. Pat. No. 5,691,073 which claimed benefit of Provisional Application No. 60/015,153 filed Apr. 10, 1996.

FIELD OF THE INVENTION

This invention relates to current interrupters for an electrochemical cell, which safely prevents current flow through the cell upon an excessive increase in the temperature or gas pressure therein.

BACKGROUND OF THE INVENTION

Electrochemical cells, especially high energy density cells such as those in which lithium is an active material, are subject to leakage or rupture which, in turn, can cause damage to the device which is powered by the cell or to the surrounding environment. In the case of rechargeable cells, the rise in internal temperature of the cell can result from overcharging. Undesirable temperature increases are often accompanied by a corresponding increase in internal gas pressure. This is likely to occur in the event of an external short circuit condition. It is desirable that safety devices accompany the cell without unduly increasing the cost, size or mass of the cell.

Such cells, particularly rechargeable cells utilizing lithium as an active material, are subject to leakage or rupture caused by a rise in internal temperature of the cell which often is accompanied by a corresponding increase in pressure. This is likely to be caused by abusive conditions, such as overcharging or by a short circuit condition. It is also important that these cells be hermetically sealed to prevent the egress of electrolyte solvent and the ingress of moisture from the exterior environment.

As set forth above, if such a cell is overcharged, self-heating occurs. Charging at too rapid a rate or overcharging can lead to an increase in the temperature. Overcharging the cell may occur if the charging voltage or charging current becomes too high causing the cell to rapidly overheat, thus posing a safety concern. When the temperature exceeds a certain point, which varies depending upon the chemistry and structure of the cell, an undesirable and uncontrollable thermal runaway condition begins. In addition, because of the overheating, internal pressure builds up, and electrolyte may suddenly be expelled from the cell. It is preferable to initiate controlled venting before that takes place. PTC (positive thermal expansion coefficient) devices whose resistance increases with current passage therethrough have been used in attempt to prevent excessive current throughput through a rechargeable cell. However, such devices alone are inadequate in preventing a thermal runaway condition from occurring if the cell becomes overcharged, for example, if excessive charging voltage is employed.

Conventional cell designs employ an end cap fitting which is inserted into an open ended cylindrical casing after the cell anode and cathode active material and appropriate separator material and electrolyte have been inserted into the cylindrical case. The end cap is in electrical contact with one of the anode or cathode material and the exposed portion of the end cap forms one of the cell terminals. A portion of the cell casing forms the other terminal.

SUMMARY OF THE INVENTION

The present invention has one or several current interrupt mechanisms integrated within a single end cap assembly which may be applied advantageously to primary or secondary (rechargeable) cells, for example, by inserting the end cap assembly into the open end of a casing for the cell. The end cap assembly of the invention has particular application to rechargeable cells, for example, lithium-ion and rechargeable lithium cells and the like using liquid or polymer electrolyte or hybrid polymer/liquid electrolyte and nickel metal hydride, nickel cadmium, or other rechargeable cells. The end cap assembly of the invention overcomes the danger of the cell overheating and pressure building up in the cell during exposure to high temperatures, excessive or improper charging or discharging, or shorting of the cell.

In one aspect the invention is directed to an end cap assembly for an electrochemical cell wherein the end cap assembly has integrated therein a thermally responsive current interrupt mechanism which activates to interrupt and prevent current from flowing through the cell when the cell interior overheats to exceed a predetermined temperature. The end cap assembly has an exposed end cap plate which functions as a terminal of the cell. When the assembly is applied to a cell and the cell is in normal operation the end cap plate is in electrical communication with a cell electrode (anode or cathode). The thermally activated current interrupt mechanism integrated within the end cap assembly may comprise a bimetallic member that deflects when exposed to temperature above a predetermined value. The deflection of the bimetallic member pushes against a movable metal member to sever electrical connection between an electrode of the cell and the end cap terminal plate thus preventing current from flowing through the cell. Alternatively, in another aspect of the invention a thermally responsive pellet may be used instead of the bimetallic member. If the temperature of the cell exceeds a predetermined value, the thermal pellet melts causing a metallic member supported thereon to deflect sufficiently to sever the electrical pathway between an electrode of the cell and the end cap terminal plate. In another aspect of the invention the thermally responsive current interrupt mechanism may include a shape memory alloy member integrate into the end cap assembly. During normal operation of the cell the shape memory member provides a portion of the electrical pathway between the end cap plate and one of the cell electrodes to allow current to pass through the cell. When the cell temperature reaches a predetermined value the shape memory member deflects thereby breaking the electrical pathway and immediately interrupting current flow through the cell.

A diode, preferably a Zener diode may advantageously be placed within the current interrupt assembly in proximity to the to the thermally responsive member, that is, in proximity to the bimetallic disk, shape memory member or meltable pellet. The Zener diode is electrically connected in parallel to the cell terminals. If the cell is inadvertently overcharged, prolonged charging or charging at excessive voltage will cause heating of the diode which in turn causes the bimetallic disk or shape memory member to deflect or causes the pellet, if present, to melt to break said electrical pathway thereby shutting down the cell. A rupturable plate or membrane may be integrated into the end cap assembly along with the thermally responsive current interrupt mechanism. When pressure within the cell builds up to exceed a predetermined value the plate or membrane ruptures allowing gas from the interior of the cell to escape to the external environment.

In another aspect the invention is directed to an end cap assembly for cells, particularly rechargeable cells, wherein the end cap has integrated therein two current interrupt mechanisms one being thermally responsive and the other being pressure responsive. The thermally responsive current interrupt mechanism may preferably employ a bimetallic member, a shape memory member or thermally responsive meltable pellet which activates to interrupt and prevent current flow through the cell when the cell interior overheats to exceed a predetermined temperature. The assembly may include a diode, preferably a Zener diode, in proximity to the thermally responsive member. The Zener diode is electrically connected in parallel with the cell terminals. If the cell is inadvertently overcharged, prolonged charging or charging at excessive voltage will cause heating of the diode which in turn causes the bimetallic or shape memory member to deflect or the pellet, if present, to melt to break said electrical pathway thereby shutting down the cell. The pressure responsive current interrupt mechanism activates to interrupt current flow when gas pressure in the cell builds up to exceed a predetermined value. In such case, the pressure interrupt mechanism may cause a metal diaphragm within the end cap assembly to deflect thereby severing the electrical connection between the cell end cap terminal plate and a cell electrode, thereby preventing current from flowing through the cell. In the case of extreme gas pressure buildup the metal diaphragm also ruptures allowing gas to be channeled into interior chambers within the end cap assembly and out to the external environment through a series of vent holes.

Another aspect of the invention is directed to a sealing mechanism for the end cap assembly of the invention. The sealing mechanism prevents leakage of electrolyte, liquid or gas from the end cap interior to the external environment and prevents ingress of moisture into the cell.

BRIEF DESCRIPTION OF THE DRAWINGS

The features of the invention will be better appreciated with reference to the drawings in which:

FIG. 1 shows the thermally activated current interrupt mechanism and pressure activated current interrupt mechanism in circuit connected mode.

FIG. 2 shows the thermally activated current interrupt mechanism in circuit interrupted mode.

FIG. 3 shows the pressure activated current interrupt mechanism in pressure activated, circuit interrupted mode.

DETAILED DESCRIPTION

Figure 7:
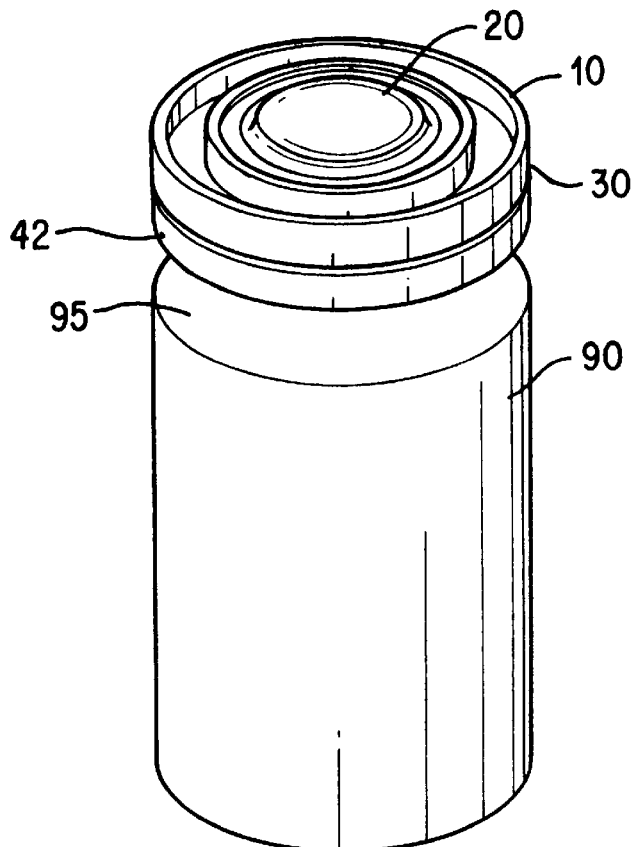
FIG. 7 is a perspective view showing the end cap assembly of the invention being inserted into the open end of a cylindrical casing of a cell.

The end cap assembly 10 (FIG. 1) of the invention may be applied to primary or secondary (rechargeable) cells. In a preferred embodiment the end cap assembly 10 is insertable into the open end 95 of a typically cylindrical casing 90 for the cell (FIG. 7). The cells contain a positive electrode (cathode on discharge), a negative electrode (anode on discharge), separator and electrolyte and positive and negative external terminals in electrical communication with the positive and negative electrodes, respectively.

Figure 1:
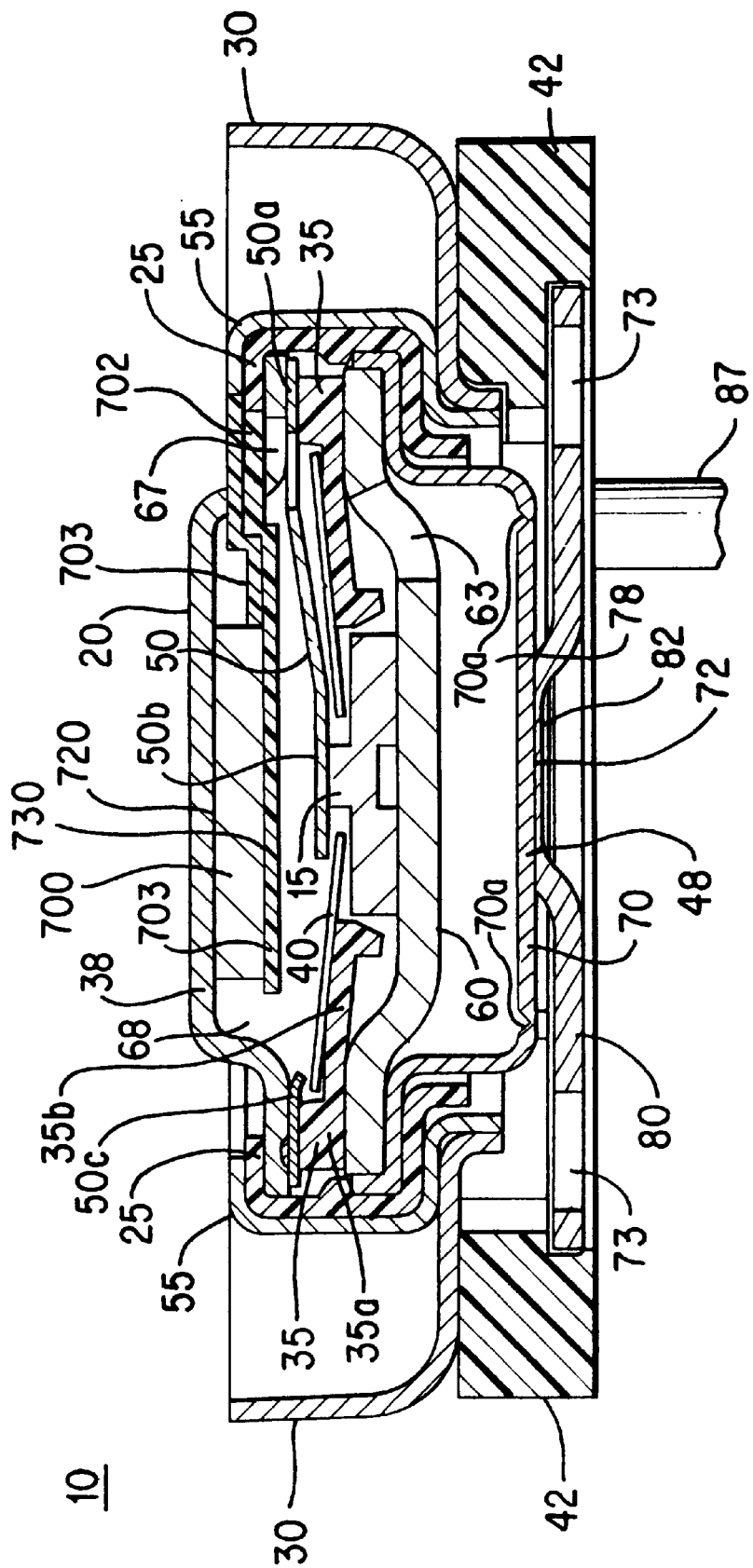
FIGS. 1, 2 and 3 are vertical cross-sectional views taken through sight lines 1—1 of the end cap assembly of FIG. 6.

Referring now to FIG. 1 of the drawings, an end cap assembly 10 intended for insertion into the open end of a cell case comprises a thermally activatable current interrupter subassembly 38 and a pressure relief subassembly 48 integrated therein. Subassemblies 38 and 48 are separated by a common support plate 60. Subassemblies 38 and 48 are held within a cover 30 by crimp ring 55 which lies within cover 30. Cover 30 defines the outer wall of the end cap assembly 10. Interrupter subassembly 38 is defined at its top end by a cup-shaped end cap plate 20 and at its bottom end by a contact plate 15 which is welded to support plate 60. Cup shaped end cap plate 20 forms one of the external terminals of the cell. Support plate 60 separates chamber 68 within thermal subassembly 38 from chamber 78 within pressure relief subassembly 48. Contact plate 15 is electrically connected to support plate 60 which in turn is electrically connected to an electrode 88 (anode or cathode) of the cell when end cap assembly 10 is applied to a cell. A thermally responsive circuit interrupter mechanism (40,50) is provided to complete the circuit between contact plate 15 and end cap 20. If temperature within the cell exceeds a predetermined threshold value the interrupter mechanism activates breaking electrical contact between end cap 20 and contact plate 15 thereby preventing current from flowing through the cell.

The pressure relief subassembly 48 comprises a thin metallic diaphragm 70 connected to a pressure resistant plate 80 which in turn is electrically connected to a cell electrode 88 through conductive tab 87 which is welded to plate 80. (Pressure resistant plate is electrically conductive and of sufficient thickness that it does not substantially deform at elevated pressures at least up to about 600 psi (4.14×10$^6$ pascal.) If gas pressure within the cell builds up to exceed a predetermined threshold value diaphragm 70 bulges outwardly to break electrical contact with pressure resistant plate 80 thereby preventing current from flowing to or from the cell. Pressure resistant plate 80 and support plate 60 preferably also have perforations, 73 and 63, respectively, therein which helps to vent gas and relieve pressure buildup within the cell.

In the preferred embodiment shown in FIG. 1 end cap assembly 10 may be used in a rechargeable cell, for example, a lithium-ion rechargeable cell. (A lithium-ion rechargeable cell is characterized by the transfer of lithium ions from the negative electrode to the positive electrode upon cell discharge and from the positive electrode to the negative electrode upon cell charging. It may typically have a positive electrode of lithium cobalt oxide ($Li_xCoO_2$) or lithium nickel oxide ($LiNi_xO_2$) or cobalt substituted lithium nickel oxide ($LiCo_xNi_yO_2$) or lithium manganese oxide of spinel crystalline structure ($Li_xMn_2O_4$). The lithium-ion cell typically has a negative electrode employing carbon or tin oxide materials. The negative electrode constitutes the anode of the cell during discharge and the cathode during charging, and the positive electrode constitutes the cathode of the cell during discharge and the anode during charging. The electrolyte for such cells may comprise a lithium salt dissolved in a mixture of non-aqueous solvents. The salt may be $LiPF_6$ and the solvents may advantageously include dimethyl carbonate (DMC), ethylene carbonate (EC), propylene carbonate (PC) and mixtures thereof. The present invention is applicable as well to other rechargeable cells, for example, nickel metal hydride cells and nickel cadmium cells. End cap assembly 10 comprises an end cap terminal 20 which is typically the positive terminal of the rechargeable cell, a metal support plate 60 which forms a support base under the cap plate 20, and an insulator disk 35 between end cap 20 and support plate 60. Cap assembly 10 is advantageously also provided with a pressure relief diaphragm 70 below support plate 60 as shown in FIG. 1. Diaphragm 70 may be welded to an underlying pressure resistant plate 80. This may be conveniently done by welding the base 72 of diaphragm 70 to a raised portion 82 of underlying pressure resistant plate 80. Diaphragm 70 should be of material that is electrically conductive and of minimal thickness of between about 0.1 and 0.5 millimeter, depending on the pressure at which the diaphragm is intended to actuate. The diaphragm 70 may desirably be of aluminum. The diaphragm 70 is advantageously coined so that it ruptures at a predetermined pressure. That is, the diaphragm surface may be stamped or etched so that a portion of the surface is of smaller thickness than the remainder. One preferred diaphragm 70 for use in the present invention is coined to impose a semicircular or "C" shaped groove 70a in its surface. The shape of the groove advantageously is the same or similar to the shape of a major portion of the peripheral edge of diaphragm 70 and positioned advantageously in proximity to the peripheral edge. The particular pressure at which venting takes place is controllable by varying parameters such as the depth, location or shape of the groove as well as hardness of the material. When pressure becomes excessive the diaphragm will rupture along the groove line. End cap 20 and support plate 60 define a chamber 68 therebetween in which is situated a thermally activated current interrupter subassembly 38. Insulator disk 35 is formed of a peripheral base portion 35a and a downwardly sloping arm 35b extending therefrom. Arm 35b extends into chamber 68. Diaphragm 70 is designed to rupture when gas buildup within the cell reaches a predetermined threshold level. The region between support plate 60 and diaphragm 70 forms a chamber 78 into which gas buildup within the cell may vent upon rupture of diaphragm 70.

Figure 5:
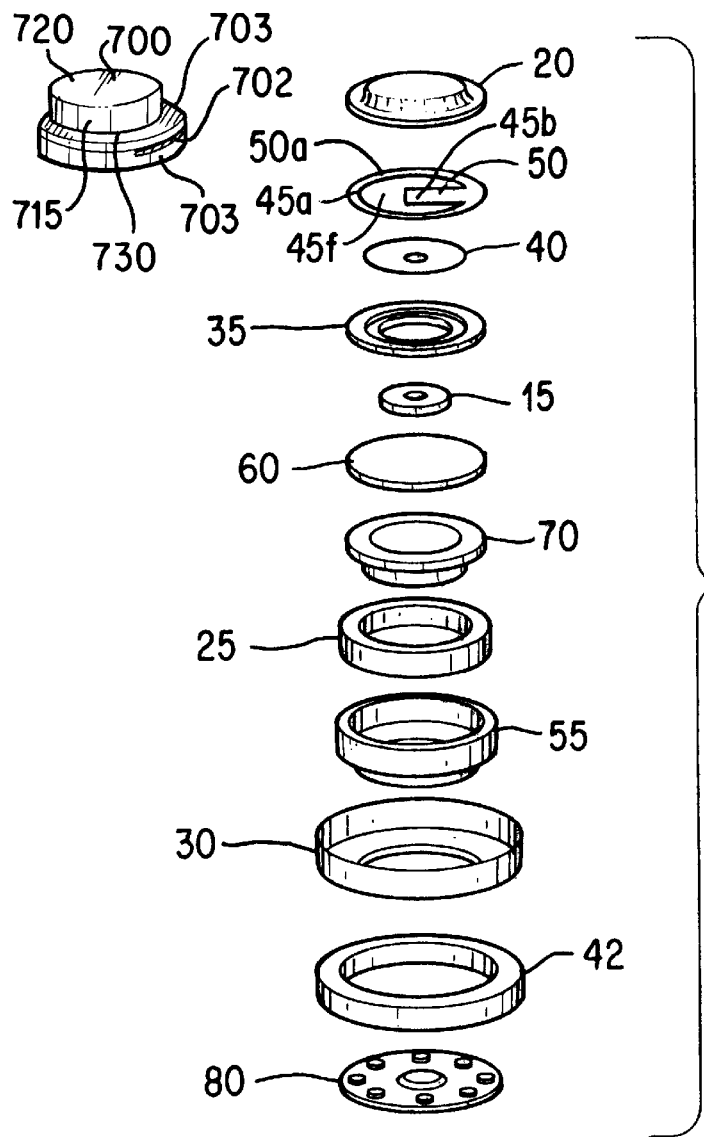
FIG. 5 is an exploded perspective view of the components of end cap assembly of the invention shown in the embodiment of FIG. 1 or FIG. 9.

Current interrupter subassembly 38 comprises a thermally responsive bimetallic disk 40, a metallic contact plate 15 in electrical contact with a resilient springlike member 50. As shown in FIGS. 1 and 5 resilient member 50 may be formed of a single flexible member having an outer circular peripheral portion 50a from which a disk retainer tab portion 50c extends radially inward to generally hold bimetallic disk 40 freely in place during any orientation of the cell while not restricting its snap acting movement. This member can be welded at one point of outer portion 50a to end cap plate 20 with a center contact portion 50b in contact with plate 15. Additionally, contact portion 50b can be designed with a reduced cross sectional area so that it can act as a disintegratable fuse link to protect against power surge conditions. Bimetallic disk 40 is positioned to freely engage sloping arms 35b of insulator disk 35 which arms act as the disk seat for disk 40. Bimetallic disk 40 also preferably includes a central aperture for receiving a raised contacting portion of metallic contact plate 15. Contact plate 15 preferably includes a central aperture for receiving a raised for resilient member 50 to rest as shown in FIG. 1. Current interrupt subassembly 38 of end cap assembly 10 may also include a diode, preferably a Zener diode chip 700. The positive metallic face 720 of the diode is connected to end cap 20 by attaching it thereto by conductive solder. A conductive lead 702 may be electrically connected to the end cap assembly crimp ring 55. Connector lead 702 may be welded to negative face 730. Crimp ring 55 is electrically connected to outer wall 30 which in turn is electrically connected to the cell's negative lead 702 extending from the diode becomes electrically connected tot he cell's negative terminal (cell casing). Electrical insulation 703 is provided over and under negative lead 702 surrounding the lead and protect it from contact with end cap 20 or any of the internal metallic components within end cap assembly 10 which are positive. Insulation 703 may be in the form of a film composed of polyester or polyimide material. Alternatively, insulation 703 may be polyvinylchloride. Similarly, the exposed metallic negative face 730 of the diode is covered with insulating material 703 such as with an insulating film of polyester or polyimide material to prevent contact between negative face 730 of the diode and metallic components within assembly 10 which are positive. The Zener diode 700 desirably has a Zener voltage under about 5.0 volts preferably between about 4.7 and 5.0 volts and a wattage of between about 100 and 500 microwatts for use in end cap assembly 10 when applied to lithium ion cells. A preferred Zener diode 700 for application to end cap assembly 320 used in conjunction with a lithium ion cell may be Zener diode (500 microwatt) wafer chip type no. CDC5230 having a Zener voltage of 4.7 volts available from Compensated Devices Inc. of Melrose, Mass. The Zener diode 700 together with conductive lead 702 and insulation 703 forms a diode subassembly having a thickness between about 0.25 and 0.35 mm.

Figure 11:
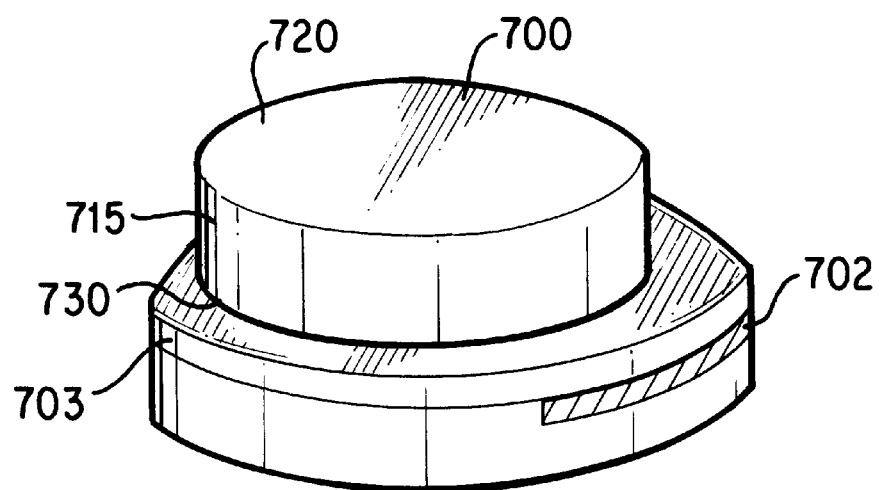
FIG. 11 is a perspective view of an oval disk shaped configuration for the diode subassembly.
Figure 12:
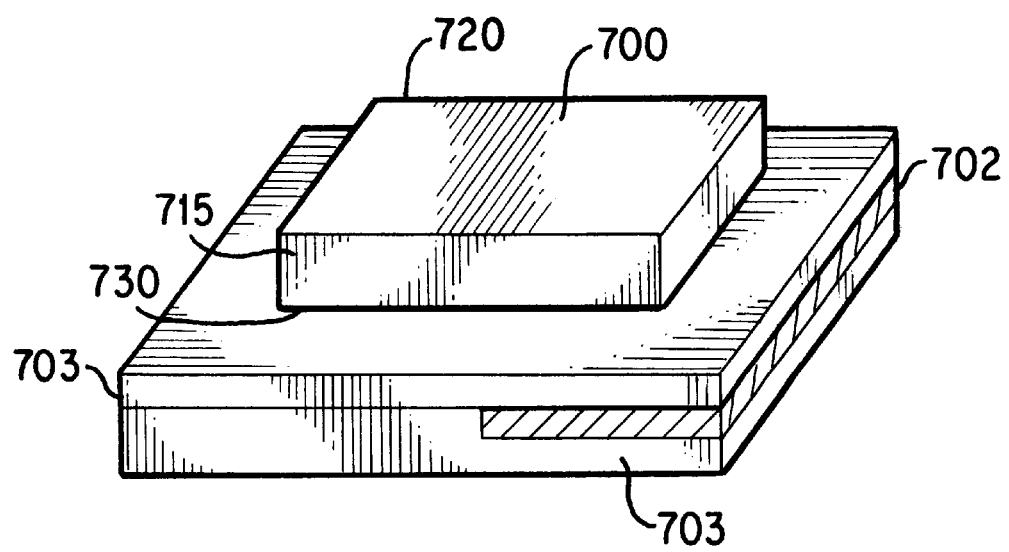
FIG. 12 is a perspective view of a rectangular disk shaped configuration for the diode subassembly.

Zener diode 700 is a two terminal semiconductor junction device which may be in wafer form, for example, as a thin oval (FIG. 11) or polygonal wafer disk, preferably a rectangular or square wafer disc as shown in FIG. 12 or in cylindrical form. In the wafer or disk form the Zener diode has a metallized positive terminal face (cathode) 720, a metallized negative terminal face (anode) 730, and a core semiconductor junction layer 715 between the two terminal faces. Junction 715 is typically protected with silicon dioxide. In the cylindrical Zener diode, the semiconductor junction lies within the cylinder. The outside surface of the cylinder forms one of the terminal faces and an end of the cylinder forms the opposite terminal. The Zener diode when connected to an electrochemical cell or other D.C. (direct current) power supply exhibits a characteristic current vs. voltage profile. Zener diodes can be preselected by Zener voltage V* (breakdown voltage) and power consumption (watts) at the Zener voltage. If the voltage, V, across the diode terminals is varied, the resistance through the diode decreases gradually up to the Zener voltage, V*. As voltage approaches and crosses over the Zener voltage, V*, resistance through the diode drops dramatically. This means that the diode resistance becomes very small and current, I, through the diode becomes very high as voltage increases much beyond the Zener voltage, V*. As current passes through the diode the diode is subjected to $I^2R$ heating with its equilibrium surface temperature a function of the watt density (power consumption per unit of surface area.)

It has been determined that proper selection of a diode, preferably a Zener diode and placement of the diode within the end cap assembly 10 in proximity to the thermally responsive current interrupter disk 40 offers added safety in the event that the cell is exposed to an overcharged condition resulting from excessive charging voltage or high charging current. In such case the diode quickly becomes hot due to $I^2R$ heating in turn causes the current interrupter disk 40 to deflect to break the electrical pathway between electrode tab 87 and terminal end cap 20 and shut down the cell. It has been determined that including the Zener diode quickens the shut down response during such overcharge situations since the current interrupt disk 40 is exposed to and senses an additional heat source, namely the diode. The Zener diode is advantageously selected so that its Zener voltage is well beyond the normal operating voltage of the cell, but at the same time represents a voltage threshold at which it is desirable to trigger the current interrupter disk 40 to shut down the cell. The Zener diode is also selected so that the current carried at the Zener voltage is dissipated as heat reaching a temperature sufficient to cause a deflection of the current interrupter disk 40. Preferably the diode is also selected so that it will cause only negligible drain of the cell when the cell is not in use. For lithium ion cells it is desirable to select the Zener diode so that it drains less than about 100 microamp, preferably about 20 microamp, of current at 3.0 volts.

A lithium ion cell operates in a voltage range typically between about 3 and 4 volts. Therefore, selection of a proper Zener diode for lithium ion cell for use in end cap assembly 10 and other current interrupt end cap assemblies herein described may desirably have a Zener voltage under about 5.0 volts, preferably between about 4.7 and 5.0 volts and a wattage of between about 100 and 500 microwatts. Such diodes impose negligible drain on the cell when the cell is not in use and will not generate enough heat under normal charging conditions to cause the current interrupt disk 40 to deflect. A preferred Zener diode 700 for application to end cap assembly 10 used in conjunction with a lithium ion cell may be Zener diode (500 microwatt) wafer chip type no. CDC5230 having a Zener voltage of 4.7 volts supplied by Compensated Devices Inc. of Melrose, Mass. An alternative Zener diode 700 for application to end cap assembly 10 used with a lithium ion cell may be a 300 microwatt wafer chip type no. CD4688 having a Zener voltage of 4.7 volts. Such chips have a width of about 0.6 mm and thickness of about 0.25 mm.

While the preferred diode 700 for the end cap assembly of the invention is a Zener diode, other diodes could be used in its place. For example, the Zener diode could be replaced with a Schottky diode or power rectifier diode with suitable power dissipation and low voltage drain. Such diodes also exhibit the desirable characteristic of decreasing resistance as applied voltage increases and therefore could be used as a heating element in place of the Zener diode to cause current interrupter disk 40 to deflect in the event that the cell is subjected to an overcharge condition. However, such diodes are less desirable than the Zener diode since they do not exhibit a drastic drop in resistance when a specific voltage, e.g. a preselected Zener voltage, is reached.

The diode 700 in the preferred embodiments for end cap passemblies described herein is permanently connected in parallel with the terminals of the cell. In the above described preferred embodiments the positive terminal 720 of diode 700 and current interrupter resilient member 50 (FIG. 1) are electrically connected to the cell's positive terminal. Thus, when the current interrupter member 50 deflects, the electrical pathway between the positive terminal and positive electrode is broken thereby simultaneously shutting down the cell and deactivating the diode. Alternative circuit designs for inclusion of the diode are also possible. Other resistance, for example resistors, may be included in the circuit between one or both Zener diode terminals and the connection of said Zener terminal with a cell terminal of corresponding polarity. Also, the diode 700 (FIG. 1) could be connected in parallel with the cell terminals and the current interrupter 50 could be connected in series with the diode, for example, if the positive face 720 of diode 700 were connected to contact plate 15 or metal support plate 60 instead of end cap 20. In such embodiment the diode does not deactivate when current interrupt resilient member 50 deflects. Accordingly, the term parallel electrical connection of the diode 700 as used herein and in the claims is not intended to exclude the possibility of insertion of additional resistors or current interrupter 50 in the circuit leg between a diode terminal and the connection of that terminal with a cell terminal of corresponding polarity. The diodes selected as above described embodiments impose negligible drain on the cell. To eliminate entirely idle drain on the cell, one of the diode terminals can be permanently connected to a corresponding cell terminal and the other of its terminals connectable to the corresponding cell terminal by a switch which is turned on when the cell is inserted into the charging device or the device being powered.

The use of end cap assembly 10 with or without inclusion of Zener diode 700 does not preclude adding a conventional PTC (positive thermal expansion coefficient) device within the electrical pathway between the positive electrode tab 87 and the positive terminal 20. Such PTC device if added could be placed within end cap assembly 10 or external to it. However, the above described embodiment for end cap assembly 10 with inclusion of Zener diode 700 does not require the PTC device. PTC devices exhibit increasing resistance as current therethrough increases. The resistance of the PTC device, however, does not increase high enough to prevent all current from passing therethrough. The PTC device therefore does not by itself afford the same degree of protection as the above described preferred embodiment for end cap assembly 10, particularly when the cell is subjected to overcharging by use of excessive charging voltage or prolonged charging. Additionally, the thermal current interrupter disk 40 is also capable of reacting to excess charge or discharge current obviating the need to include a PTC device to afford protection for such situations.

Figure 8:
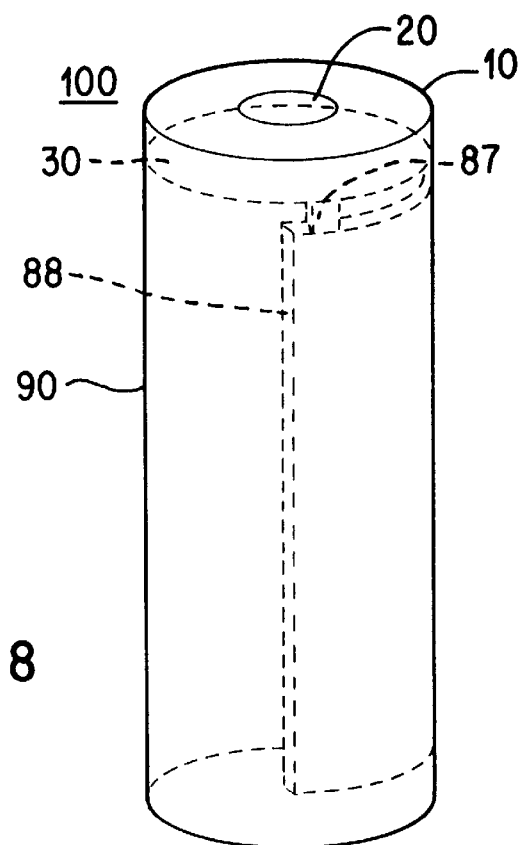
FIG. 8 is a perspective view showing a completed cell with the end cap assembly of the invention inserted into the open end of a cylindrical casing of a cell with end cap plate of said assembly forming a terminal of the cell.

There is an electrically insulating grommet 25 which extends over the peripheral edge of end cap 20 and along the bottom peripheral edge of diaphragm 70. Grommet 25 also abuts the outer edge of subassembly 38 as shown in FIG. 1. There may be a ring of metal 55 which is crimped over the top edge of grommet 25 and pressed against diaphragm 70 to seal the end cap assembly interior components. The grommet 25 serves to electrically insulate the end cap 20 from the crimp ring 55 and also to form a seal between support plate 60 and crimp ring 55. The cover 30 of the end cap assembly 10 may be formed from truncated cylindrical member shown best in FIG. 5. In a completed cell assembly (FIG. 8) the outside surface of cover 30 will come into contact with the inside surface of cell casing 90. Support plate 60 provides a base for components of subassembly 38 to rest and preferably is of bow shape to maintain active radial compressive force against the inside surface of grommet 25. Support plate 60 may be provided with perforations 63 in its surface to vent gas to upper chamber 68 when diaphragm 70 ruptures. Gas which passes into upper chamber 68 will vent to the external environment through primary vent holes 67 in end cap 20. The end cap assembly cover 30 is in contact with the cell casing 90 which is in electrical contact with the opposite terminal, typically the negative terminal in the case of a lithium-ion rechargeable cell. Thus, grommet 25 provides electrical insulation between end cap 20 and outer wall 30, that is, between the two terminals of the cell thereby preventing shorting of the cell. There may be an additional insulator ring, namely insulator standoff ring 42 between the top portion of outer wall 30 and pressure plate 80 as illustrated in FIG. 1, also to assure that there is no shorting between the positive and negative terminals of the cell.

Figure 6:
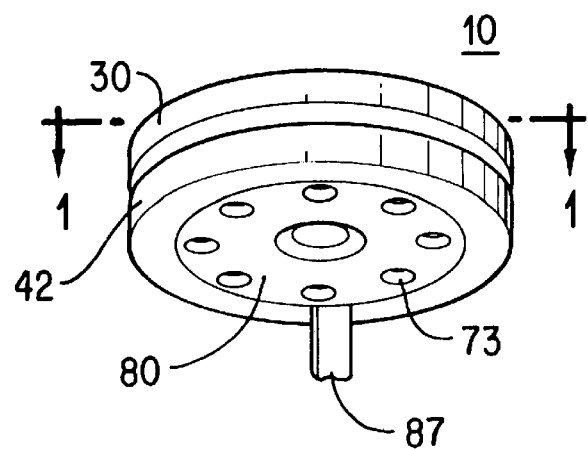
FIG. 6 is a perspective view of the bottom of the end cap assembly showing the pressure resistant plate and vent apertures therethrough.

Diaphragm 70 is preferably in the shape of a cup comprised of aluminum having a thickness advantageously of between about 3 and 10 mils. At such thickness the weld between diaphragm base 72 and support plate 80 breaks and the diaphragm base 72 bulges and separates from support plate 80 (FIG. 3) when internal gas pressure within the cell rises to a threshold value of at least between about 100 psi and 200 psi ($6.894 \times 10^5$ and $13.89 \times 10^5$ pascal). (Such pressure buildup could occur for example if the cell were being charged at higher than recommended voltage or if the cell were shorted or misused.) However, if desired the thickness of diaphragm base 72 can be conveniently adjusted to bulge at other pressure levels. The separation of diaphragm base 72 from plate 80 breaks all electrical contact between the diaphragm 70 and plate 80. This separation also breaks the electrical pathway between end cap 20 and the cell electrode 88 in contact with plate 80 so that current can no longer flow to or from the cell, in effect shutting down the cell. Even after the current path is broken if the pressure within the cell continues to rise for other reasons, for example, heating in an oven, the vent diaphragm 70 will also rupture preferably at a threshold pressure of at least between about 250 and 400 psi ($17.2 \times 10^5$ and $27.6 \times 10^5$ pascal) to prevent cell explosion. In such extreme circumstances the rupture of vent diaphragm 70 allows gas from the cell interior to vent through vent holes 73 (FIGS. 1 and 6) in pressure resistant plate 80 whereupon the gas enters lower chamber 78 (FIG. 1). The gas will then pass from lower chamber 78 to upper chamber 68 through vent holes 63 in the support plate 60 (FIG. 1) and if needed vent holes (not shown) in insulator disk 35. Gas collected in the upper chamber 68 will vent to the external environment through primary vent holes 67 in the end cap plate 20.

The current interrupt features of the invention may be described with reference to FIGS. 1–3. It should be noted that in the specific embodiment shown therein one of the cell electrodes comes into contact with plate 80 through tab 87 when the end cap assembly 10 is applied to a cell. During normal cell operation plate 80 in turn is electrically connected to end cap plate 20. In a lithium-ion cell the electrode 88 in contact with plate 80 may conveniently be the positive electrode. This electrode will be insulated from the cell casing 90. The negative electrode (not shown) will be connected to the cell casing 90. The embodiment of FIG. 1 shows the end cap assembly configuration before current is interrupted by either activation of the thermal current interrupter bimetallic disk 40 or activation of pressure relief diaphragm 70. In the specific embodiment illustrated in FIG. 1 plate 80 is in electrical contact with diaphragm 70 and diaphragm 70 is in electrical contact with support plate 60. Support plate 60 is in electrical contact with contact plate 15 which is in electrical contact with resilient member 50 which in turn is in electrical contact with end cap 20. In the integrated end cap design of the invention shown in FIG. 1, electrical contact between the electrode 88 in contact with pressure plate 80 and end cap 20 may be interrupted in two ways. As above described if pressure builds up in the cell to a predetermined threshold, contact between diaphragm 70 and pressure plate 80 is broken as diaphragm base 72 bulges away from pressure plate 80. This interruption in the circuit prevents current from flowing to or from the cell. Alternatively, if the cell overheats the bimetallic disk 40 of thermal interrupt subassembly 38 activates when the internal cell temperature or temperature of diode 700 reaches a predetermined level. In so doing the bimetallic disk pushes upwardly from insulator 35b thereby causing resilient member 50 to disengage from contact plate 15. This in effect severs the electrical path between electrode tab 87 and end cap 20, thus preventing current from flowing to or from the cell. It is an advantage of the invention to incorporate these two interrupter mechanisms within a single end cap assembly 10 which is insertable into the open end of a cell case as a single unit. It is also an advantage to incorporate a Zener diode 700 within the end cap assembly 10 for enhanced thermal sensitivity and added safety, particularly in the case of cell heating caused by prolonged charging or the use of excessive charging voltage.

The bimetallic disk 40 is preferably not physically attached to underlying insulator disk 35 but rather is free to move, that is it rests in free floating condition on disk arm 35b as shown in FIG. 1. In such design current does not pass through the bimetallic disk 40 at any time regardless of whether the cell is charging or discharging. This is because disk 40 when inactivated is not in electrical contact with contact plate 15. However, should the cell overheat beyond a predetermined threshold temperature, bimetallic disk 40 is designed to the appropriate calibration such that it snaps or deforms (FIG. 2) causing it to push resilient member 50 away from contact plate 15 thereby preventing current from flowing between the cell terminals. The bimetallic disk 40 is calibrated so that it has a predetermined dished shape which allows the disk to actuate when a given threshold temperature is reached. The free floating design of bimetallic disk 40 on insulator disk arm 35b as above described does not permit current to pass therethrough at any time regardless of whether the cell is charging or discharging. This makes the calibration of disk 40 easier and more accurate, since there is no heating effect caused by current flow through bimetallic disk 40 ($I^2R$ heating). Bimetallic disk 40 may conveniently comprise two layers of dissimilar metals having different coefficient of thermal expansion. The top layer of bimetallic disk 40 (the layer closest to end cap 20) may be composed of a high thermal expansion metal, preferably nickel-chromium-iron alloy and the underlying or bottom layer may be composed of a low thermal expansion metal, preferably nickel-iron alloy. In such embodiment disk 40 may activate when temperature rises to at least between about 60 to 75° C. causing disk 40 to deform sufficiently to push resilient member 50 away from contact with contact plate 15. It is also possible to choose the high and low thermal expansion metal layers such that the disk 40 will not reset except at a temperature below −20° C. which in most applications makes the device a single action thermostatic device.

Preferred materials for the above described components are described as follows: End cap 20 is preferably of stainless steel or nickel plated steel of between about 8 to 15 mil (0.2 and 0.375 mm) thickness to provide adequate support, strength and corrosion resistance. The outer wall 30 of the end cap assembly 10 is also preferably of stainless steel or nickel plated steel having a thickness of between about 8 and 15 mil (0.2 and 0.375 mm). Pressure plate 80 is preferably of aluminum having a thickness between about 10 and 20 mils (0.25 and 0.5 mm) which may be reduced at the center to between about 2 and 5 mils (0.05 and 0.125 mm) at the point of welded contact with diaphragm base 72. Insulator standoff ring 42 may be composed of a high temperature thermoplastic material such as high temperature polyester for strength and durability available under the trade designation VALOX from General Electric Plastics Company. Crimp ring 55 is preferably of stainless steel or nickel plated steel having a thickness between about 8 and 15 mils (0.2 and 0.375 mm) for strength and corrosion resistance. Diaphragm 70 is preferably of aluminum having a thickness of between about 3 and 10 mils (0.075 and 0.25 mm). At such thickness the diaphragm will break away from its weld to pressure plate 80 when the internal gas pressure exceeds a threshold pressure between about 100 and 250 psi ($6.89 \times 10^5$ and $17.2 \times 10^5$ pascal). Should the internal gas pressure exceed a pressure between about 250 and 400 psi ($17.2 \times 10^5$ and $27.6 \times 10^5$ pascal) diaphragm 70 will rupture to provide additional relief from gas pressure buildup. The insulator disk 35 on which bimetallic disk 40 rests is preferably of a material of high compressive strength and high thermal stability and low mold shrinkage. A suitable material for disk 35 is a liquid crystal polymer or the like of thickness between about 10 and 30 mils (0.25 and 0.75 mm) available under the trade designation VECTRA from the Celanese Co. Support plate 60 is preferably of stainless steel or nickel plated steel to provide adequate strength and corrosion resistance at a thickness of between about 10 and 30 mils (0.25 and 0.75 mm). Resilient member 50 is advantageously formed of berylium-copper, nickel-copper alloy, stainless steel or the like which has good spring action and excellent electrical conductivity. A suitable thickness for resilient member 50 when formed of beryllium-copper or nickel-copper alloy is between about 3 and 8 mils (0.075 and 0.2 mm) to give sufficient strength and current carrying capability. This material may be plated or inlayed with silver or gold at the contact region to provide lower electrical resistance in this area. Contact plate 15 is advantageously formed of cold rolled steel plated with a precious metal such as gold or silver to lower contact resistance and improve reliability. It may also be formed of a nickel-copper clad alloy, stainless steel, or nickel-plated steel. Grommet 25 typically is made of polymeric material such as nylon or polypropylene. The seal around the end cap assembly components should be hermetic in order that electrolyte, both in the form of liquid and vapor, is prevented from entering into the end cap chambers or from leaving the cell.

After the end cap assembly 10 is completed it may be inserted into the open end 95 of a cylindrical cell case 90 shown in FIG. 7. The circumferential edge of cell casing 90 at the open end thereof is welded to the outer wall of cover 30 of end cap assembly 10 to provide a hermetically tight seal between end cap assembly 10 and the cell casing 90. The radial pressure of the circumferential wall of crimp ring 55 against grommet 25 and diaphragm 70 produces a hermetically tight seal around the interior components of end cap assembly 10.

Figure 3:
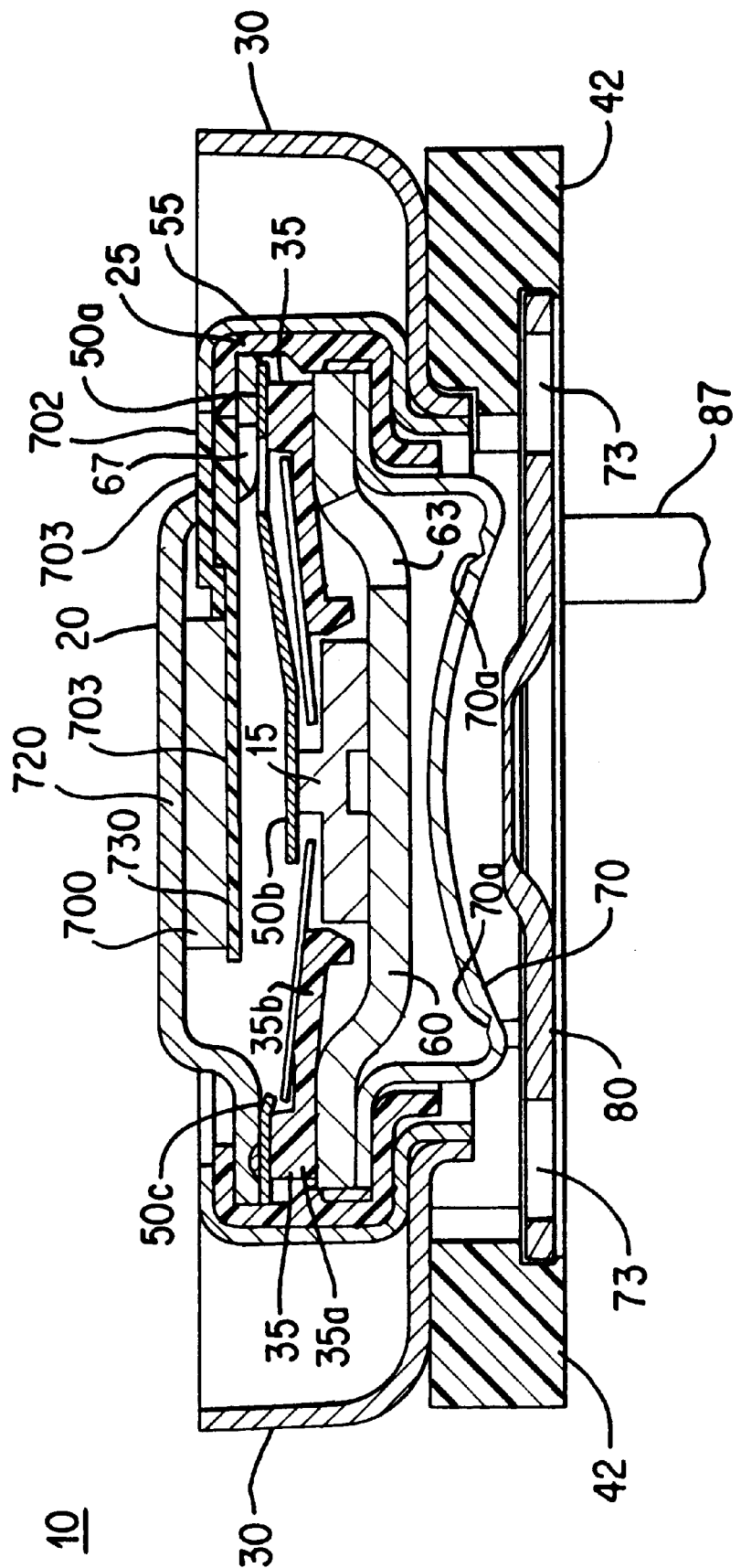
Figure 4:
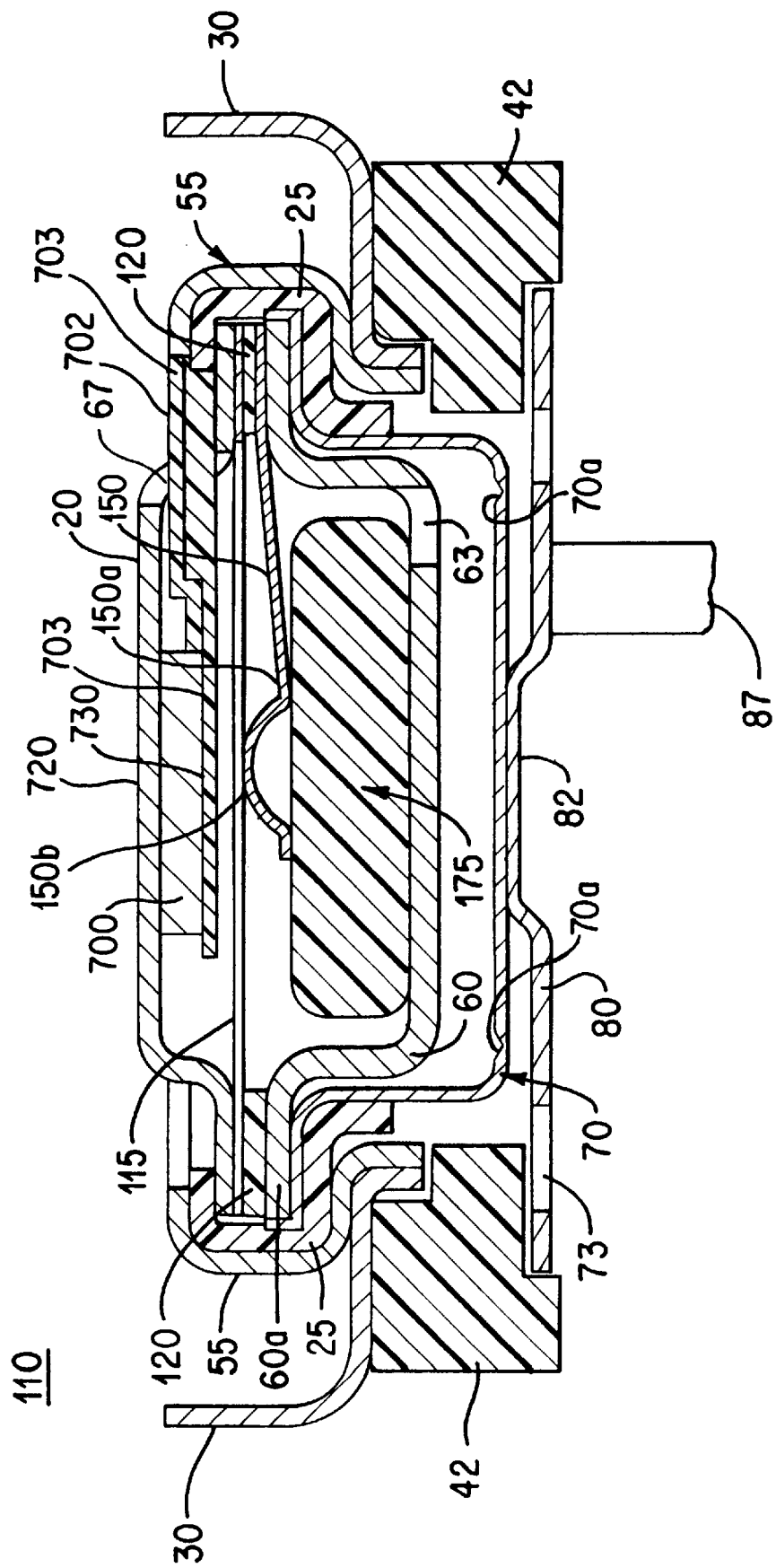
FIG. 4 is a vertical cross-sectional view of another embodiment of an end cap assembly having pressure activated current interrupt mechanism and thermally activated current interrupt mechanism integrated therein in which a heat sensitive member softens to release a resilient member to open the circuit.

An alternative embodiment of the end cap design having both a pressure relief mechanism and thermally activated current interrupt mechanism integrated therein is shown as end cap assembly 110 in FIG. 4. The embodiment of FIG. 4 is similar to that described above with respect to FIGS. 1–3 except that a bimetallic disk is not employed to activate the springlike mechanism. Instead a thermal pellet 175 is provided to hold a resilient springlike member 150 in electrical contact with contact plate 115. Contact plate 115 in turn is in electrical contact with end cap plate 20. Resilient member 150 may comprise an elongated metallic arm 150a which is welded at one end to support plate 60. Support plate 60 is in electrical contact with diaphragm 70 which in turn is welded to a raised portion 82 of underlying pressure resistant plate 80. An electrode tab 87 is in electrical contact with plate 80. Resilient member 150 preferably terminates at its opposite end in a cup or convex shaped portion 150b which contacts contact plate 115. There is an electrical insulator disk 120 over the peripheral edge 60a of support plate 60 to prevent direct contact between support plate 60 and contact plate 115. Thus, there will be electrical contact between support plate 60 and end cap 20 as long as resilient member 150 is held pressed against contact plate 115. Support plate 60 in turn is in electrical contact with aluminum diaphragm 70 which is in contact with plate 80 and a cell electrode 88 through tab 87 when the end cap assembly 110 is applied to a cell. (End cap assembly 110 may be applied to a cell by inserting it into the open end of a cylindrical casing 90 in the same manner as above described with reference to the embodiment shown in FIG. 1.) Therefore, as resilient member 150 is held pressed against contact plate 115 by thermal pellet 175, there is electrical contact between a cell electrode 88 (through tab 87) and end cap plate 20 permitting normal cell operation. If the cell overheats beyond a predetermined threshold temperature pellet 175 melts thereby removing support for resilient member 150. Melting of pellet 175 causes resilient member 150 to snap downwardly and break electrical contact with contact plate 115. This in effect severs the electrical pathway between the electrode tab 87 and end cap 20 thus preventing current from flowing to or from the cell. If the internal gas pressure within the cell exceeds a predetermined value diaphragm 70 will rupture thereby severing electrical contact between plate 80 and diaphragm 70 and also allows gas to escape to the external environment through vent holes 63 and 67 in support plate 60 and end cap 20, respectively.

End cap assembly 110 (FIG. 4) may also include a diode, preferably a wafer Zener diode 700 in oval or polygonal disk configuration, preferably in square configuration as shown in FIG. 12. Zener diode is placed in proximity to thermal pellet 175 as shown in FIG. 4. The positive metallic face 720 of the diode is connected to end cap 20 by attaching it thereto by conductive solder. A conductive lead 702 which may be in the form of a metallic wire or tab is provided extending from the negative face 730 of the diode. Lead 702 may be electrically connected to the end cap assembly crimp ring 55. Connector lead 702 may be welded to negative face 730. Crimp ring 55 is electrically connected to outer wall 30 which in turn is electrically connected to the cell's negative terminal by welding it to the cell's casing 90. Thus, the negative lead 702 extending from the diode becomes electrically connected to the cell's negative terminal (cell casing). Electrical insulation 703 is provided over and under negative lead 702 surrounding lead 702 to protect it from contact with end cap 20 or any of the internal metallic components within end cap assembly 110 which are positive. Insulation 703 may be in the form of a film of polyester or polyimide material. Alternatively, insulation 703 may be polyvinylchloride. Similarly, the exposed metallic negative face 730 of the diode is covered with insulating material such as with an insulating film of polyester or polyimide material to prevent contact between negative face 730 of the diode and metallic components within assembly 110 which are positive. The Zener diode 700 desirably has a Zener voltage under about 5.0 volts, preferably between about 4.7 and 5.0 volts and a wattage of between about 100 and 500 microwatts for use in end cap assembly 110 when applied to lithium ion cells. A preferred Zener diode 700 for application to end cap assembly 110 used in conjunction with a lithium ion cell may be Zener diode (500 microwatt) wafer chip type no. CDC5230 having a Zener voltage of 4.7 volts available from Compensated Devices Inc. of Melrose, Mass.

Figure 2:
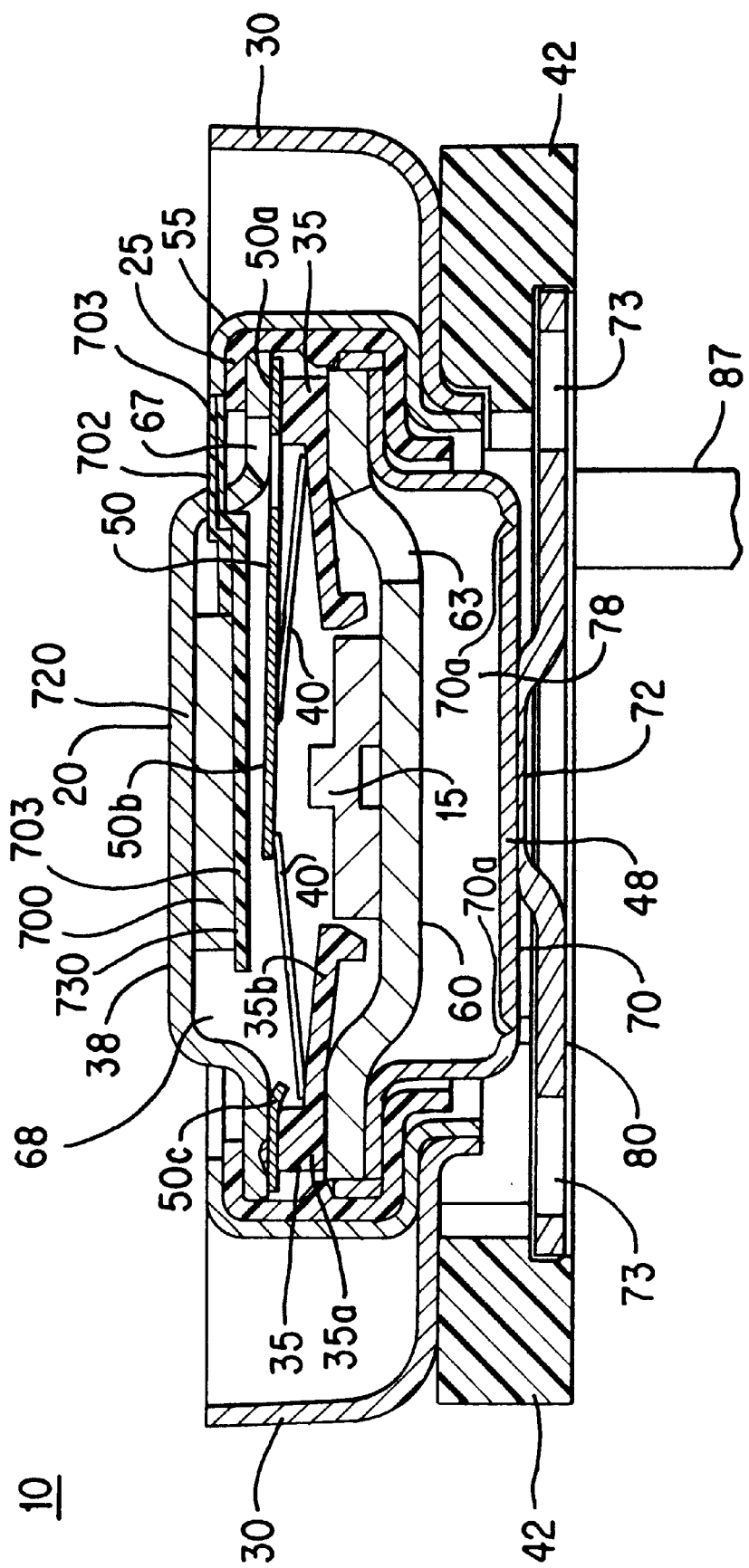

Preferred materials for the end cap 20, support plate 60, contact plate 115 and aluminum diaphragm 70 referenced in the embodiment shown in FIG. 4 may be the same as described for the corresponding elements having the same reference numerals shown in FIGS. 1–3. Contact plate 115 is preferably formed of stainless steel or nickel plated cold rolled steel plated with silver or gold to lower its contact resistance. The insulator disk 120 shown in FIG. 4 is preferably made of a high temperature thermoplastic material having excellent dielectric properties. A preferred material for disk 120 may a polyimide available under the trade designation KAPTON from E.I. DuPont Co. or high temperature polyester available under the trade designation VALOX from General Electric Plastics Co. Resilient member 150 may advantageously be formed of beryllium-copper alloy of thickness between about 5 and 10 mils (0.125 and 0.25 mm) to provide good conductivity when in contact with plate 115 and reliable spring action when the pressure of pellet 175 against it is removed. Additionally, the resilient arm 150 may be plated with silver or gold to increase its conductivity. The thermal pellet 175 is advantageously formed of a polymer having a relatively low melting point, e.g., between about 65° C. and 100° C. but yet excellent compressive strength to keep the resilient arm 150 in place during normal cell operation. A suitable material for thermal pellet 175 having such properties is a polyethylene wax available under the trade designation POLYWAX from Petrolyte Co. A thermal pellet 175 of such polyethylene wax melts within a desirable temperature range of between about 75° C. and 80° C.

Figure 9:
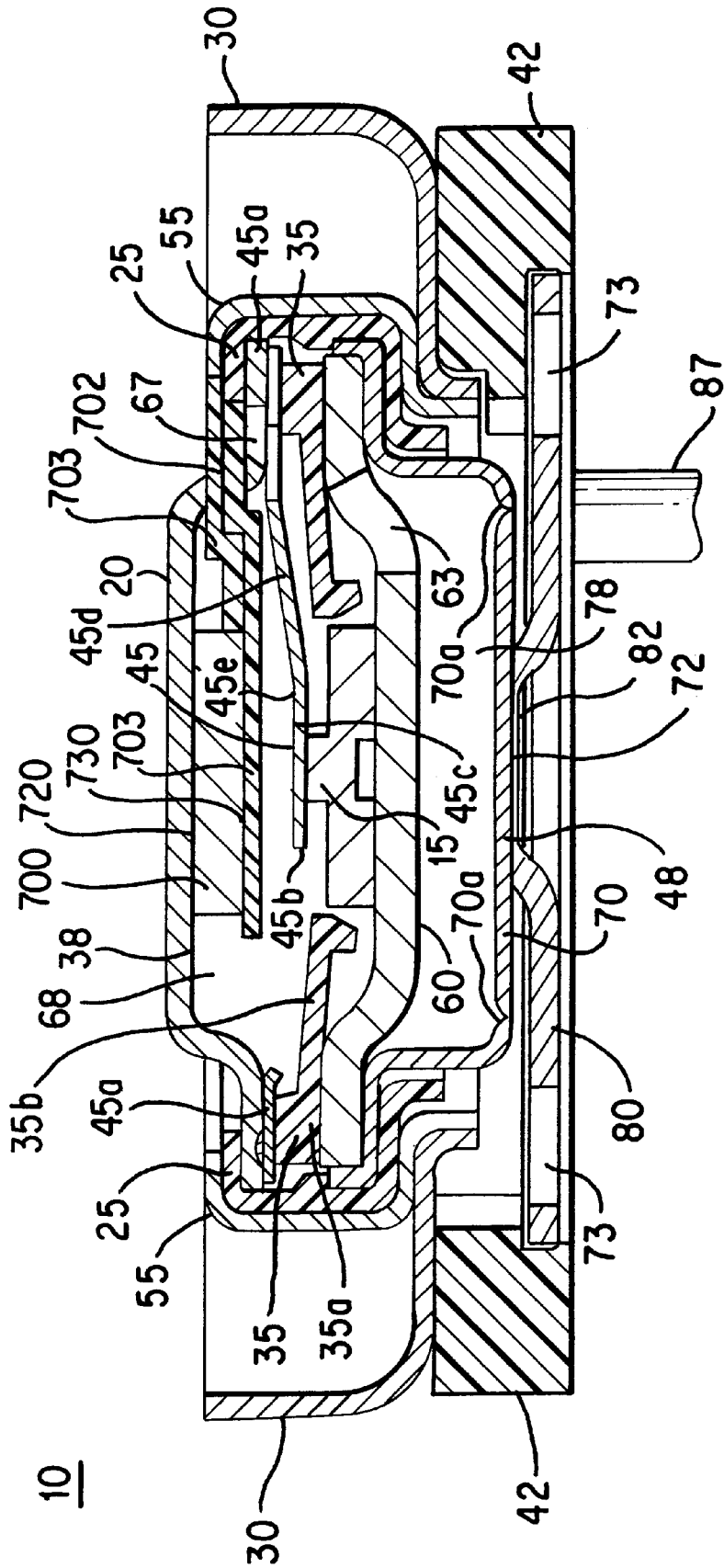
FIG. 9 is a vertical cross sectional view which shows the thermally activated current interrupt mechanism employing a shape memory member and pressure activated current interrupt mechanism in circuit connected mode.
Figure 10:
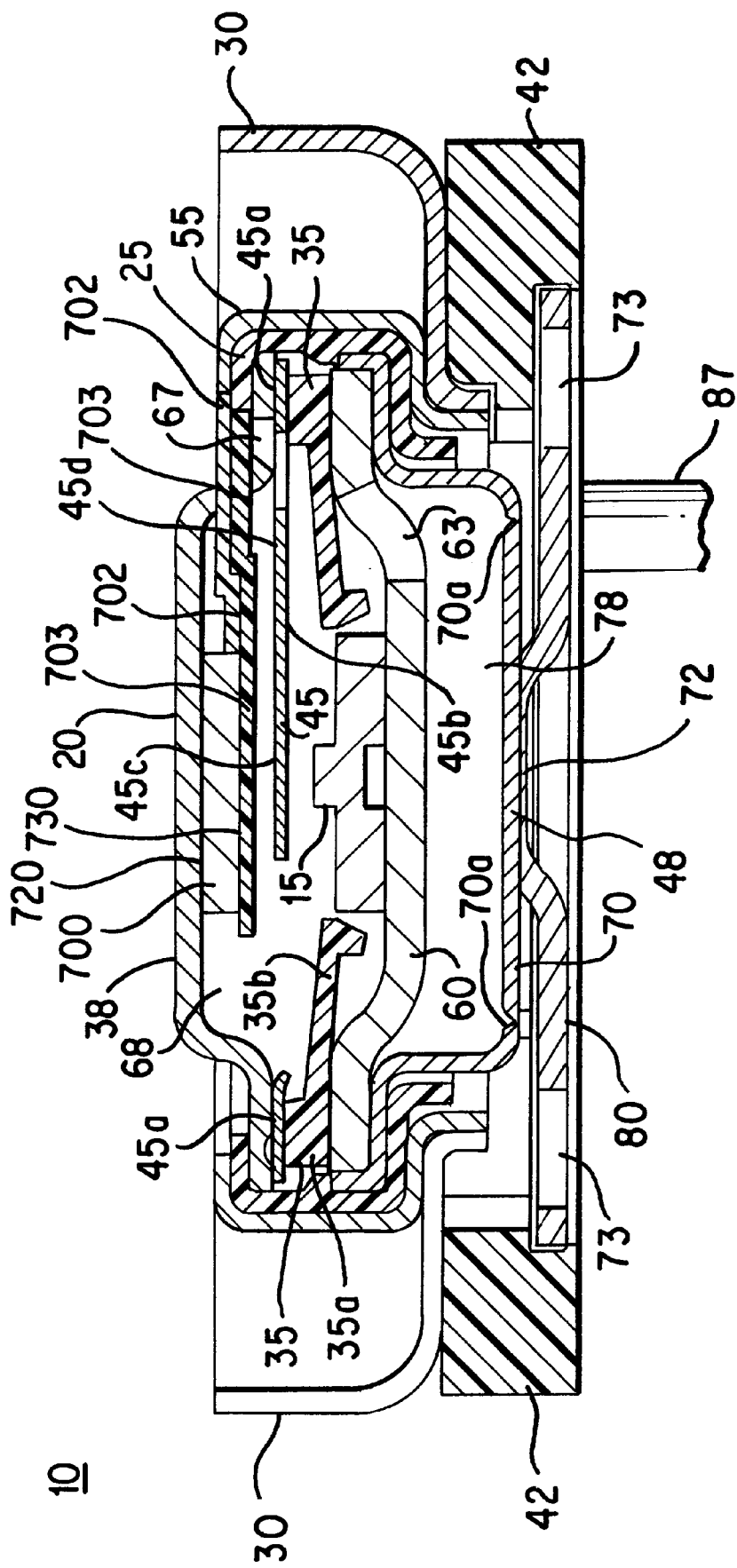
FIG. 10 is a vertical cross section view which shows the thermally activated current interrupt mechanism employing the shape memory member in circuit interrupted mode.

Another alternative embodiment is shown in FIGS. 9 and 10. This embodiment is essentially the same as the embodiment depicted in FIGS. 1–2 and for the same application except that the thermally responsive current interrupt mechanism comprises a shape memory alloy member 45 in place of bimetallic disk 40 and spring 50. A shape memory alloy is an alloy by which a plastically deformed metal is restored to its original shape by a solid state phase change caused by heating. The shape memory response is brought about by the strong crystallographic relationship between the phase stable at low temperature known as martensite and the phase stable at high temperature known as austenite. The shape to be remembered is formed in the austenite phase when the alloy is held in place and heated and when the alloy is cooled the material develops the martensitic structure. In use when the shape memory alloy is heated it returns to its remembered shape in austenite phase. Shape memory alloys for the application described herein are commercially available, for example, from Special Metals Corp. of New Hartford, N.Y.

The shape memory alloy member 45 (FIG. 9) is electrically conductive and may advantageously have the same shape as spring 50 (FIG. 1). It thus may be desirably formed of a single partially hollow disk, for example, a disk 45 having a discontinuous surface, namely, a surface with an aperture 45f (FIG. 5) therethrough. The disk 45 has an outer edge 45a (FIG. 5) and a flexible portion 45b protruding inwardly into the hollow portion, e.g. into said aperture, from peripheral edge 45a. The flexible portion 45b is preformed advantageously with a slight bend 45e in its surface as shown in FIG. 9 so that its terminal end 45c rests flat against contact plate 15 to complete the electrical pathway between positive electrode 87 and end cap 20. The thickness of flexible portion 45b is smaller than its length. The thickness of flexible portion 45b is desirably less than 1 mm, preferably between 0.2 and 0.5 mm. Flexible member 45b is oriented horizontally within end cap assembly 10 as shown in FIG. 9 so that the current path through member 45b will be at least substantially in the direction of its thickness and preferably essentially all of the current path through member 45b may be in the direction of its thickness. If the cell internal temperature becomes too high for any reason, e.g., occurrence of an uncontrolled exothermic reaction, memory metal member 45 will flex and flatten thereby breaking electrical contact with contact plate 15. In application to rechargeable batteries, particularly lithium ion cells, the memory metal alloy 45 may be preformed by the manufacturer to flex desirably at a temperature between 60° C. and 120° C. When such temperature is reached memory metal member 45 will immediately flex to interrupt current flow and shut down the cell, thus preventing exothermic reaction which could lead to a thermal runaway situation.

A desirable shape memory alloy to activate at such temperatures may be selected from known memory alloy groups, for example, nickel-titanium (Ni-Ti), copper-zinc-aluminum (Cu-Zn-Al), and copper-aluminum-nickel (Cu-Al-Ni). However, it has been determined that the most desirable alloy for shape memory alloy member 45 is a nickel-titanium alloy for application as the above described current interrupter for electrochemical cells. A preferred nickel titanium memory alloy is available under the trade designation NITINOL alloy from Special Metals Corporation. The shape memory member 45 may be of resettable alloy, that is, one that deforms when heated but returns to its original shape upon cooling without application of external force. However, the shape memory metal 45 for the present application need not be resettable, that is, may irreversibly deform when heated to its activation temperature. The memory element 45 of the preferred alloy material NITINOL alloy is normally fabricated such that it is not resettable once it is activated. The preferred memory element 45 of NITINOL alloy may conveniently be fabricated as a single piece having a circular peripheral edge (FIG. 5) from which protrudes inwardly a flexible portion. The flexible portion 45b may conveniently be of rectangular shape and comprising an outer portion 45d and an inner portion 45c separated by bend 45e. Memory element 45 flexes along bend 45e when a predetermined activation temperature, preferably a temperature between about 60° C. and 120° C. is reached, element 45b deflects away from contact with contact plate 15 as shown in FIG. 10, thus interrupting current flow within the cell. In order to achieve such activation effect it has been determined that the thickness of the NITINOL alloy member 45 may advantageously be in a range between about 0.2 and 0.5 mm with a surface area such that the resistance of said member is less than about 5 milli-ohm. The above described shape for memory member 45, namely a hollow disk having a circular outer edge 45a from which protrudes inwardly a flexible portion 45b is desirable, since it allows for reduced thickness and good contact area to reduce the overall resistance of member 45. The shape memory member 45 desirably does not have a deformation strain of more than about 8 percent. Also, the angle between portion 45c and 45d is desirably between about 10 and 30 degrees. This allows memory member 45*b* to deflect away from contact plate 15 and flatten when the activation temperature is reached. In application to lithium ion cells the above described preferred design for memory member 45 may result in its overall resistance being less than 5-milliohm which in turn allows a current drain of up to 5 amp under continuous cell operation. Although a rectangular shape for the flexible portion 45*b* is desirable other shapes may also be used, for example, the flexible portion member 45 may be tapered somewhat so that the average width of 45*b* is smaller that the average width of portion 45*d* In the preferred design the bottom surface of memory element 45 may be smooth, that is without legs or protrusions emanating therefrom.

Memory metal 45 has the advantage of requiring fewer components in that spring 50 used in connection with the bimetallic disk embodiment can be eliminated. Thus, memory element 45 has built into a single element dual properties of heat responsive activation and spring-like flexing upon such activation. Also the spring-like force per unit mass of memory element 45 is greater than that of bimetallic disk 40. This property renders the memory element 45 particularly suitable for application to small cells, for example AAA size cells or thin prismatic rechargeable cells. In this case of cells having a diameter or width smaller than the width of AAA size cells, width less than about 10.0 mm, the rupturable pressure diaphragm 70 may be eliminated because of the small available space within the end cap assembly 10. In such application the memory member 45 and above described preferred structural design for end cap assembly 10 could still be employed except that support plate 60 and diaphragm 70 could be merged into a single member having the shape and orientation of plate 60 shown in FIG. 9. In such design lower chamber 78 and vent holes 63 would be eliminated. Contact plate 15 may also be optional, since the shape memory member 45*b* may be in direct electrical contact with plate 60 which could thus function as the contact plate.

End cap assembly 10 (FIGS. 9 and 10) may also include a diode, preferably a wafer Zener diode 700 in oval or polygonal disk configuration, preferably in square configuration as shown in FIG. 12. Zener diode is placed in proximity to the shape memory member 45 as shown in FIGS. 9 and 10. It is an advantage to incorporate a Zener diode 700 within the end cap assembly 10 for enhanced thermal sensitivity and added safety, particularly in the case of cell heating caused by prolonged charging or the use of excessive charging voltage. The positive metallic face 720 of the diode is connected to end cap 20 by attaching it thereto by conductive solder. A conductive lead 702 which may be in the form of a metallic wire or tab is provided extending from the negative face 730 of the diode. Connector lead 702 may be electrically connected to the end cap assembly crimp ring 55. Connector lead 702 may be welded to the diode's negative face 730. Crimp ring 55 is electrically connected to outer wall 30 which in turn is electrically connected to the cell's negative terminal by welding it to the cell's casing 90. Thus, the negative lead 702 extending from the diode becomes electrically connected to the cell's negative terminal (cell casing). Electrical insulation 703 is provided over and under negative lead 702 to protect it from contact with end cap 20 (FIGS. 9 and 10) or any of the internal metallic components within end cap assembly 10 which are positive. Insulation 703 may be in the form of a film composed of polyester or polyimide material. Alternatively, insulation 703 may be polyvinylchloride. Similarly, the exposed metallic negative face 730 of the diode is covered with insulating material 703 such as with an insulating film of polyester or polyimide material to prevent contact between negative face 730 of the diode and metallic components within assembly 10 which are positive. The Zener diode 700 desirably has a Zener voltage under about 4.7 volts, preferably between about 4.7 and 5.0 volts and a wattage of between about 100 and 500 microwatt or use in end cap assembly 10 when applied to lithium ion cells. A preferred Zener diode 700 for application to end cap assembly 10 (FIGS. 9 and 10) used in conjunction with a lithium ion cell may be Zener diode (500 microwatt) wafer chip type no. CDC5230 having a Zener voltage of 4.7 volts available from Compensated Devices Inc. of Melrose, Mass.

A preferred embodiment of an end cap assembly incorporating a memory metal element 45 has also a pressure responsive diaphragm 70 which activates to expand in the manner illustrated in FIG. 3 to break the electrical pathway between positive electrode 87 and end cap plate 20 when pressure within the cell reaches a predetermined level. Also as previously described with reference to the embodiments shown in FIGS. 1–3 pressure diaphragm 70 (FIGS. 9 and 10) may also have grooves 63 which are designed to rupture to let gas pass therethrough when pressure within the cell exceeds a predetermined level. If the pressure build-up within the cell is drastic, the central portion 45 of diaphragm 70 will also rupture thereby allowing a wider area for escape of gas from the interior of the cell.

An enlarged view of the end cap assembly 10 of FIGS. 1 and 9 is shown in FIG. 5. The end cap assembly 10 may be made by assembling the components shown in FIG. 5 in the following order: With reference to construction of the embodiment shown in FIG. 1 a preassembly is formed comprising components 20, 50, 40, 35, 15, 60, 70, 25, and 55. With reference to construction of the embodiment shown in FIG. 9 the preassembly is formed comprising components 20, 45, 35, 15, 60, 70, 25, and 55.

The preassembly of the embodiment shown in FIG. 1 is conveniently accomplished by first inserting plastic grommet 25 into crimp ring 55, then inserting vent diaphragm 70 into grommet 25 and then inserting support plate 60 with contact plate 15 welded thereto into vent diaphragm 70. Thereupon insulator disc 35 is placed around contact plate 15 and bimetallic disk 40 is placed to rest on outwardly sloping arm 35*b* of insulator disk 35. Bimetallic disk 40 is not bonded to insulator disk 35 but rests thereon in a free floating condition, with the insulator disk helping to act as positioning means for the bimetallic disk. The top surface of the outer end of resilient springlike member 50 is welded to the circumferential edge of end cap 20. The positive metallic face 720 of Zener diode 700 is connected to the inside surface of end cap 20, preferably by welding. The end cap 20 with resilient member 50 and Zener diode 700 welded thereto is then placed over insulator disk 35 so that the raised central portion of contact plate 15 contacts the interior end of resilient member 50 and the bottom surface of the outer end of resilient member 50 contacts the circumferential edge of insulator disk 35. Thus, the outer end of resilient member 50 is wedged between end cap 20 and insulator disk 35 and the opposite or inner end of member 50 is in contact with contact plate 15. The diode's negative connection 702 is welded to the top edge of crimp ring 55.

The preassembly of the embodiment shown in FIG. 9 is constructed in similar manner except that bimetallic disk 40 is eliminated and the shape memory member 45 is employed in place of spring 50. Thus, the preassembly of the embodiment shown in FIG. 9 is conveniently accomplished by first inserting plastic grommet 25 into crimp ring 55, then inserting vent diaphragm 70 into grommet 25 and then inserting support plate 60 with contact plate 15 welded thereto into vent diaphragm 70. Memory member 45 is then welded to the circumferential edge of end cap 20. The positive metallic face 720 of Zener diode 700 is connected to the inside surface of end cap 20, preferably by welding. The end cap 20 with memory member 45 and Zener diode 700 welded thereto is then placed over insulator disk 35 so that the raised central portion of contact plate 15 contacts the interior end of memory member 45 and the bottom surface of the outer end of memory member 45 contacts the circumferential edge of insulator disk 35. Thus, the outer end of memory member 45 is wedged between end cap 20 and insulator disk 35 and the opposite or inner end of member 45 is in contact with contact plate 15.

With reference to construction of either the embodiment of FIGS. 1 or 9 the ring 55 is then mechanically crimped over the top edge of grommet 25 to hold the top end of grommet 25 tightly pressed against the circumferential edge of end cap 20. This crimping is accomplished by applying mechanical force along the centroidal (vertical) axis of ring 55. Then in a second crimping step mechanical pressure is applied radially to the walls of crimp ring 55, thereby completing assembly of the preassembly. The radial crimping serves to keep the preassembly internal components tightly and hermetically sealed within the ring 55. The preassembly is then inserted into metallic cover 30 so that the bottom surface of crimp ring 55 rests against the bottom inside edge of cover 30. Thereupon the bottom surface of crimp ring 55 is welded to the bottom inside surface of cover 30. Pressure plate 80 is then snapped into the bottom of insulator standoff ring 42 and the standoff ring 42 with pressure plate 80 attached thereto is then placed against the outside bottom surface of cover 30 so that the raised central portion of pressure plate 80 contacts vent diaphragm 70. This point of contact between pressure plate 80 and diaphragm 70 is then spot welded thus completing construction of end cap assembly 10. The end cap assembly 10 may be applied to a cell, for example, by inserting it into the open end of the cylindrical casing 90 of a cell as shown in FIG. 7 and welding the outer surface of cover 30 to the inside surface of the cylindrical casing 90 at the open end 95 thereof. This results in cell 100 shown in FIG. 8 with end cap assembly 10 being tightly sealed within the cylindrical casing 90 and the end cap plate 20 forming a terminal of the cell.

While this invention has been described in terms of certain preferred embodiments, the invention is not to be limited to the specific embodiments but rather is defined by the claims and equivalents thereof.

What is claimed is:

1. An end cap assembly for application to an electrochemical cell having a positive and a negative terminal and a pair of electrodes (anode and cathode), said end cap assembly comprising a housing and an exposed end cap plate, said plate functional as a cell terminal, said end cap assembly having an electrically conductive pathway therethrough permitting the end cap plate to be electrically connected to a cell electrode when said end cap assembly is applied to a cell, said end cap assembly further including thermally responsive means for preventing current from flowing through said electrical pathway and electrical resistance means in proximity to said thermally responsive means, said resistance means causing heating as current passes therethrough, said resistance means exhibiting decreasing resistance as voltage applied thereto increases, wherein said thermally responsive means activates when the temperature within said end cap assembly rises causing a break in said electrical pathway.

2. The end cap assembly of claim 1 wherein said resistance means comprises a diode located within said housing, said diode having a positive and a negative terminal for parallel electrical connection to the positive and negative terminals, respectively, of said cell.

3. The end cap assembly of claim 1 wherein said resistance means comprises a diode subassembly having a Zener diode located within said housing, said Zener diode having a positive and a negative terminal for parallel electrical connection to the positive and negative terminals, respectively, of said cell.

4. The end cap assembly of claim 3 wherein a terminal of said Zener diode is electrically connected to said exposed end cap plate of said assembly.

5. The end cap assembly of claim 1 where said assembly is a self-contained structure.

6. The end cap assembly of claim 3 wherein said diode subassembly comprises a conductive member connected to one of the terminals of said diode, said conductive member extending from the diode for electrical connection to a cell terminal of like polarity.

7. The end cap assembly of claim 6 wherein said conductive member is surrounded by electrical insulation.

8. The end cap assembly of claim 3 wherein the Zener diode has a wattage between about 100 and 500 microwatts.

9. The end cap assembly of claim 8 wherein the Zener diode has a Zener voltage of less than about 5 volts.

10. The end cap assembly of claim 3 wherein said Zener diode is a wafer chip.

11. The end cap assembly of claim 6 wherein said diode subassembly is in the form of a wafer having a polygonal or oval shape.

12. The end cap assembly of claim 1 further comprising a pressure responsive means comprising a member capable of rupture located at the end of said end cap assembly opposite said end cap plate, said member rupturing when gas pressure on the side thereof farthest from said end cap plate rises producing a rupture in said member allowing gas to pass therethrough.

13. The end cap assembly of claim 1 wherein said cell has a cylindrical casing and the end cap assembly is applied to the cell by inserting it into the open end of the cylindrical casing and welding the end cap assembly to the casing.

14. The end cap assembly of claim 1 wherein said thermally responsive means comprises a chamber within said end cap assembly having a bimetallic member and a resilient electrically conductive member, the resilient member forming a portion of said electrical pathway, wherein when the cell temperature within said assembly rises, the bimetallic member deforms thereby pushing against said resilient metallic member causing a break in said electrical pathway.

15. The end cap assembly of claim 14 wherein the bimetallic member rests freely on a surface of an electrically insulating member within said end cap assembly.

16. The end cap assembly of claim 15 wherein a portion of said resilient metallic member is sandwiched between a portion of said end cap plate and a portion of said electrically insulating member and wherein the end cap assembly comprises a contact plate which forms part of said electrical pathway, wherein said resilient member is in electrical contact with said contact plate.

17. The end cap assembly of claim 12 further comprising a separation member placed across the interior width of the end cap assembly and between said end cap plate and said member capable of rupture, said separation member separating said thermal responsive means from said pressure responsive means.

18. The end cap assembly of claim 17 wherein said separation member comprises a metallic plate having at least one aperture therein so that when said member capable of rupture ruptures, gas passes through said aperture and into said chamber within said end cap assembly.

19. The end cap assembly of claim 18 wherein said end cap plate has at least one aperture therethrough so that when said member capable of rupture ruptures, gas collected from said chamber passes through said end cap aperture and to the external environment.

20. The end cap assembly of claim 17 wherein said member capable of rupture comprises a diaphragm.

21. The end cap assembly of claim 16 wherein when the temperature of said bimetallic member rises it deforms causing the resilient conductive member to sever its electrical connection with said contact plate, thereby causing a break in said electrical pathway.

22. The end cap assembly of claim 20 further comprising an electrically insulating grommet in contact with the peripheral edge of the end cap plate and the peripheral edge of the diaphragm, said end cap assembly further comprising a metallic member (crimping member) mechanically crimped around said grommet to hold said diaphragm plate and said end cap plate under mechanical compression.

23. The end cap assembly of claim 22 further comprising a metallic cover around said crimping member.

24. The end cap assembly of claim 23 wherein the end cap assembly is applied to a cell by inserting it into the open end of a cylindrical casing for the cell and welding the outside surface of said cover to the inside surface of said casing, whereupon the end cap assembly becomes tightly sealed within the cylindrical case with the end cap plate comprising a terminal of the cell being exposed to the external environment.

25. The end cap assembly of claim 1 wherein the thermally responsive means comprises a resilient conductive member in electrical contact with said end cap plate, and a meltable mass of material holding said resilient conductive member in electrical connection between said end cap plate and another conductive portion of the end cap assembly, said other conductive portion adapted to be electrically connected to a cell electrode when the end cap assembly is applied to a cell thereby providing an electrical connection between said end cap plate and said electrode during cell operation, wherein when the cell temperature rises said mass of material melts thereby causing movement in said resilient metallic member to sever the electrical connection between said end cap plate and said cell electrode thereby preventing operation of the cell.

26. An end cap assembly for application to an electrochemical cell having a positive and a negative terminal and a pair of internal electrodes (anode and cathode), said end cap assembly comprising a housing, a chamber within the housing, and an exposed end cap plate, said plate functional as a cell terminal, said end cap assembly having an electrically conductive pathway therethrough permitting the end cap plate to be electrically connected to a cell electrode when said end cap assembly is applied to a cell, said end cap assembly further comprising a) thermally responsive means for preventing current from flowing through said electrical pathway and a.1) electrical resistance means electrically connected to said cell terminals for causing heating as current passes therethrough, said resistance means exhibiting decreasing resistance as voltage applied thereto increases, wherein said thermally responsive means comprises a shape memory alloy member which activates when the temperature within said end cap assembly rises causing a break in said electrical pathway, and said end cap assembly further comprises b) a pressure responsive means comprising a member capable of rupture located at the end of said end cap assembly opposite said end cap plate, said member rupturing when gas pressure on the side thereof farthest from said end cap plate rises producing a rupture in said member allowing gas to pass therethrough.

27. The end cap assembly of claim 26 wherein said resistance means comprises a diode located within said housing, said diode having a positive and a negative terminal for parallel electrical connection to the positive and negative terminals, respectively, of said cell.

28. The end cap assembly of claim 26 wherein said resistance means comprises diode subassembly comprising a Zener diode located within said housing, said Zener diode having a positive and a negative terminal for parallel electrical connection to the positive and negative terminals, respectively, of said cell.

29. The end cap assembly of claim 28 wherein a terminal of said Zener diode is electrically connected to said exposed end cap plate of said assembly.

30. The end cap assembly of claim 26 where said assembly is a self-contained structure.

31. The end cap assembly of claim 28 wherein said diode subassembly comprises a conductive member connected to one of the terminals of said diode, said conductive member extending from the diode for connection to a cell terminal of like polarity.

32. The end cap assembly of claim 31 wherein the body of said conductive member is surrounded by electrical insulation.

33. The end cap assembly of claim 28 wherein the Zener diode has a wattage of between about 100 and 500 microwatts.

34. The end cap assembly of claim 33 wherein the Zener diode has a Zener voltage less than about 5 volts.

35. The end cap assembly of claim 28 wherein said Zener diode is a wafer chip.

36. The end cap assembly of claim 31 wherein said diode subassembly is in the form of a wafer having a polygonal or oval shape.

37. The end cap assembly of claim 26 wherein said shape memory alloy comprises a nickel-titanium alloy.

38. The end cap assembly of claim 26 wherein said cell has a cylindrical casing and the end cap assembly is applied to the cell by inserting it into the open end of the cylindrical casing and welding the end cap assembly to the casing.

39. The end cap assembly of claim 26 wherein said thermally responsive means comprises a chamber within said end cap assembly, the shape memory alloy member forming a portion of said electrical pathway, wherein when the cell temperature within said assembly rises, the shape memory alloy member deforms thereby causing a break in said electrical pathway.

40. The end cap assembly of claim 39 wherein said shape memory element comprises a flexible member of single piece construction having a bent surface wherein when the cell temperature within said assembly rises, the surface of said shape memory member deforms causing a break in said electrical pathway.

41. The end cap assembly of claim 39 wherein said shape memory member comprises a disk having an aperture therethrough, said disk having an outer edge with a flexible portion protruding into said aperture from a portion of the outer edge, wherein the outer edge rests on a surface of an insulating member within said end cap assembly, wherein said flexible portion has a bent surface, wherein when the cell temperature within said assembly rises, said bent surface deforms causing a break in said electrical pathway.

42. The end cap assembly of claim 41 wherein said outer edge of said shape memory member is sandwiched between a portion of said end cap plate and a portion of said electrically insulating member and wherein the end cap assembly comprises a contact plate which forms part of said electrical pathway, wherein said shape memory member is in electrical contact with said contact plate.

43. The end cap assembly of claim 26 further comprising a separation member placed across the interior width of the end cap assembly and between said end cap plate and said member capable of rupture, said separation member separating said thermal responsive means from said pressure responsive means.

44. The end cap assembly of claim 43 wherein said separation member comprises a metallic plate having at least one aperture therein so that when said member capable of rupture ruptures, gas passes through said aperture and into said chamber within said end cap assembly.

45. The end cap assembly of claim 43 wherein said end cap plate has at least one aperture therethrough so that when said member capable of rupture ruptures, gas collected from said chamber passes through said end cap aperture and to the external environment.

46. The end cap assembly of claim 45 wherein said member capable of rupture comprises a diaphragm.

47. The end cap assembly of claim 46 further comprising an electrically insulating grommet in contact with the peripheral edge of the end cap plate and the peripheral edge of the diaphragm, said end cap assembly further comprising a metallic member (crimping member) mechanically crimped around said grommet to hold said diaphragm and said end cap plate under mechanical compression.

48. The end cap assembly of claim 47 further comprising a metallic cover around said crimping member.

49. The end cap assembly of claim 48 wherein the end cap assembly is applied to a cell by inserting it into the open end of a cylindrical casing for the cell and welding the outside surface of said cover to the inside surface of said casing, whereupon the end cap assembly becomes tightly sealed within the cylindrical case with the end cap plate comprising a terminal of the cell being exposed to the external environment.

50. The end cap assembly of claim 26 wherein said shape memory alloy member comprises a disk having an aperture through the thickness thereof, said shape memory member having a peripheral edge with a flexible portion protruding inwardly into said aperture from a portion of said peripheral edge, wherein said edge rests on a surface of an insulating member within said end cap assembly, wherein when the cell temperature within the cell assembly rises, said flexible portion deforms causing a break in said electrical pathway.

51. In an electrochemical cell of the type formed by an end cap assembly inserted into an open ended cylindrical case for the cell, said cell further having a positive and a negative terminal and a pair of internal electrodes (anode and cathode), wherein said end cap assembly has a housing and an exposed end cap plate, said end cap plate functional as a cell terminal, the improvement comprising said end cap plate being electrically connected to one of said electrodes through an electrically conductive pathway within said end cap assembly, wherein said end cap assembly comprises a) thermally responsive means comprising an electrically conductive shape memory alloy member for preventing current from flowing through the cell and a.1) electrical resistance means in proximity to said thermally responsive means, said resistance means causing heating as current passes therethrough, said resistance means exhibiting decreasing resistance as voltage applied thereto increases, wherein said shape memory member comprises a flexible member having a bent surface and a thickness smaller than its length, said flexible member oriented within said end cap assembly so that current passes substantially in a direction through the thickness of said flexible member, wherein when the cell temperature rises, said shape memory member deflects along said bent surface causing a break in said electrical pathway between said end cap plate and said electrode thereby preventing current from flowing through the cell.

52. The electrochemical cell of claim 51 wherein said resistance means comprises a diode located within said housing, said diode having a positive and a negative terminal electrically connected in parallel to the positive and negative terminals, respectively, of said cell.

53. The electrochemical cell of claim 51 wherein said resistance means comprises diode subassembly comprising a Zener diode located within said housing, said Zener diode having a positive and a negative terminal electrically connected in parallel to the positive and negative terminals, respectively, of said cell.

54. The electrochemical cell of claim 53 wherein a terminal of said Zener diode is electrically connected to said exposed end cap plate of said assembly wherein said connected terminal of the Zener diode is of same polarity as said exposed end cap plate.

55. The electrochemical cell of claim 51 where said assembly is a self-contained structure.

56. The electrochemical cell of claim 53 wherein said diode subassembly comprises a conductive member connected to one of the terminals of said diode, said conductive member extending from the diode and electrically connected to a cell terminal of like polarity.

57. The electrochemical cell of claim 56 wherein the body of said conductive member is surrounded by electrical insulation.

58. The electrochemical cell of claim 53 wherein the Zener diode has a wattage between about 100 and 500 microwatts.

59. The electrochemical cell of claim 58 wherein the Zener diode has a Zener voltage of less than about 5 volts.

60. The electrochemical cell of claim 53 wherein said Zener diode is a wafer chip.

61. The electrochemical cell of claim 56 wherein said diode subassembly is in the form of a wafer having a polygonal or oval shape.

62. The electrochemical cell of claim 51 wherein said shape memory member comprises a disk having an aperture through the thickness thereof, said disk having a peripheral outer edge with said flexible member protruding inwardly into said aperture from a portion of said peripheral edge, said flexible member having a bent surface which deflects when the cell temperature rises.

63. The electrochemical cell of claim 51 wherein said shape memory member comprises a nickel-titanium alloy.

64. The electrochemical cell of claim 51 further comprising b) pressure responsive means allowing gas from the interior of the cell to pass into the interior of said end cap assembly when internal gas pressure within the cell rises.

65. The electrochemical cell of claim 64 wherein said pressure responsive means comprises a diaphragm plate located at the end of said end cap assembly opposite said end cap plate, said diaphragm plate rupturing when gas pressure on the side thereof farthest from said end cap plate rises producing a rupture in said diaphragm allowing gas to pass therethrough.

\* \* \* \* \*